(12) United States Patent
Maita et al.

(10) Patent No.: US 8,955,875 B2
(45) Date of Patent: Feb. 17, 2015

(54) AIRBAG DEVICE

(75) Inventors: Akihiro Maita, Settsu (JP); Shuhei Konishi, Settsu (JP); Tomoki Hashizume, Settsu (JP)

(73) Assignee: Ashimori Industry Co., Ltd. (JP)

( * ) Notice: Subject to any disclaimer, the term of this patent is extended or adjusted under 35 U.S.C. 154(b) by 0 days.

(21) Appl. No.: 14/127,843

(22) PCT Filed: Jun. 18, 2012

(86) PCT No.: PCT/JP2012/065502
§ 371 (c)(1),
(2), (4) Date: Dec. 19, 2013

(87) PCT Pub. No.: WO2012/176731
PCT Pub. Date: Dec. 27, 2012

(65) Prior Publication Data
US 2014/0110923 A1  Apr. 24, 2014

(30) Foreign Application Priority Data

Jun. 23, 2011 (JP) .................................. 2011-139791

(51) Int. Cl.
*B60R 21/237* (2006.01)
*B60R 21/213* (2011.01)
(Continued)

(52) U.S. Cl.
CPC .............. *B60R 21/237* (2013.01); *B60R 21/213* (2013.01); *B60R 21/232* (2013.01); *B60R 21/23138* (2013.01); *B60R 21/2346* (2013.01)
USPC ..................... 280/730.2; 280/743.1

(58) Field of Classification Search
CPC ................ B60R 21/237; B60R 21/232; B60R 2021/237
USPC ........................................... 280/730.2, 743.1
See application file for complete search history.

(56) References Cited

U.S. PATENT DOCUMENTS 6,626,456 B2 * 9/2003 Terbu et al. ................. 280/728.2
7,114,744 B2 * 10/2006 Sunabashiri ............... 280/730.2
(Continued)

FOREIGN PATENT DOCUMENTS

DE 102006055037 A1 * 6/2008
DE 102009051522 A1 * 5/2011
(Continued)

OTHER PUBLICATIONS

International Search Report of PCT/JP2012/065502 dated Aug. 21, 2012.

*Primary Examiner* — James English
(74) *Attorney, Agent, or Firm* — Sughrue Mion, PLLC

(57) ABSTRACT

An action of once strongly pressing an airbag against a pillar trim at the initial stage of deployment is omitted to enable the airbag to be quickly inflated and deployed without reducing the deployment speed thereof. An airbag device includes a folded airbag (10) that is attached to an upper part of a side wall inside a vehicle cabin in the front-rear direction of a vehicle, and an inflator that inflates and deploys the airbag (10) to the lower side of the vehicle. The airbag (10) includes a roll-folded portion (10R) rolled from one end thereof opposite from an attaching side, and an accordion-folded portion (10J) continuous with the roll-folded portion (10R) and folded in an accordion manner. The accordion-folded portion (10J) is folded so as to be located at a side of the roll-folded portion (10R). The accordion-folded portion (10J) is formed by folding the roll-folded portion (10R) into two and making accordion folds from the two-folded portion so as to have the same width as the width (L2) of the two-folded roll-folded portion (10R).

3 Claims, 7 Drawing Sheets

(51) Int. Cl.
  *B60R 21/232*   (2011.01)
  *B60R 21/231*   (2011.01)
  *B60R 21/2346*  (2011.01)

(56) References Cited

U.S. PATENT DOCUMENTS

| | | | |
|---|---|---|---|
| 7,163,232 B2 * | 1/2007 | Yokoyama et al. | 280/730.2 |
| 7,762,578 B2 * | 7/2010 | Dix | 280/730.2 |
| 7,766,376 B2 * | 8/2010 | Yokoyama | 280/730.2 |
| 7,841,621 B2 * | 11/2010 | Dix | 280/730.2 |
| 8,308,192 B2 * | 11/2012 | Konishi et al. | 280/743.1 |
| 8,540,279 B2 * | 9/2013 | Jun | 280/743.1 |
| 2002/0096864 A1 | 7/2002 | Asano et al. | |
| 2002/0158450 A1 | 10/2002 | Hoeft et al. | |
| 2002/0195803 A1 | 12/2002 | Terbu et al. | |
| 2003/0090093 A1 * | 5/2003 | Ikeda et al. | 280/730.2 |
| 2003/0116947 A1 | 6/2003 | Yokoyama et al. | |
| 2006/0061075 A1 | 3/2006 | Aoki et al. | |
| 2007/0075530 A1 | 4/2007 | Yokoyama | |
| 2008/0054605 A1 * | 3/2008 | Mitsuo et al. | 280/730.2 |
| 2011/0101658 A1 | 5/2011 | Konishi et al. | |
| 2013/0087999 A1 * | 4/2013 | Konishi et al. | 280/743.1 |
| 2014/0054879 A1 * | 2/2014 | Taguchi et al. | 280/730.2 |

FOREIGN PATENT DOCUMENTS

| | | |
|---|---|---|
| JP | 2000-168483 A | 6/2000 |
| JP | 2003-175792 A | 6/2003 |
| JP | 2004-058848 A | 2/2004 |
| JP | 2005-510390 A | 4/2005 |
| JP | 2005-519797 A | 7/2005 |
| JP | 2006-088846 A | 4/2006 |
| JP | 2007-091177 A | 4/2007 |
| WO | 2009/131046 A1 | 10/2009 |
| WO | WO 2013084871 A1 * | 6/2013 |

* cited by examiner

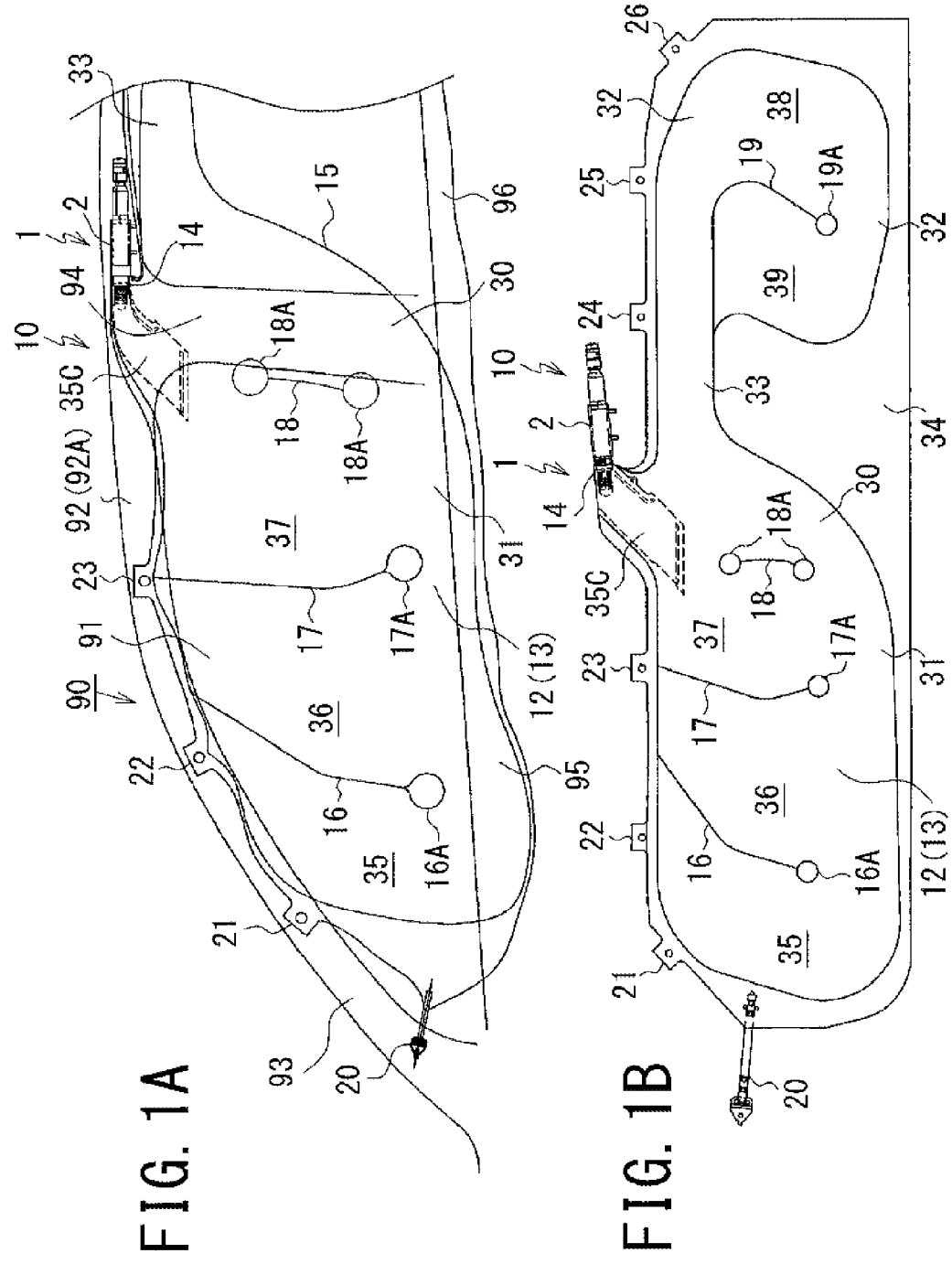

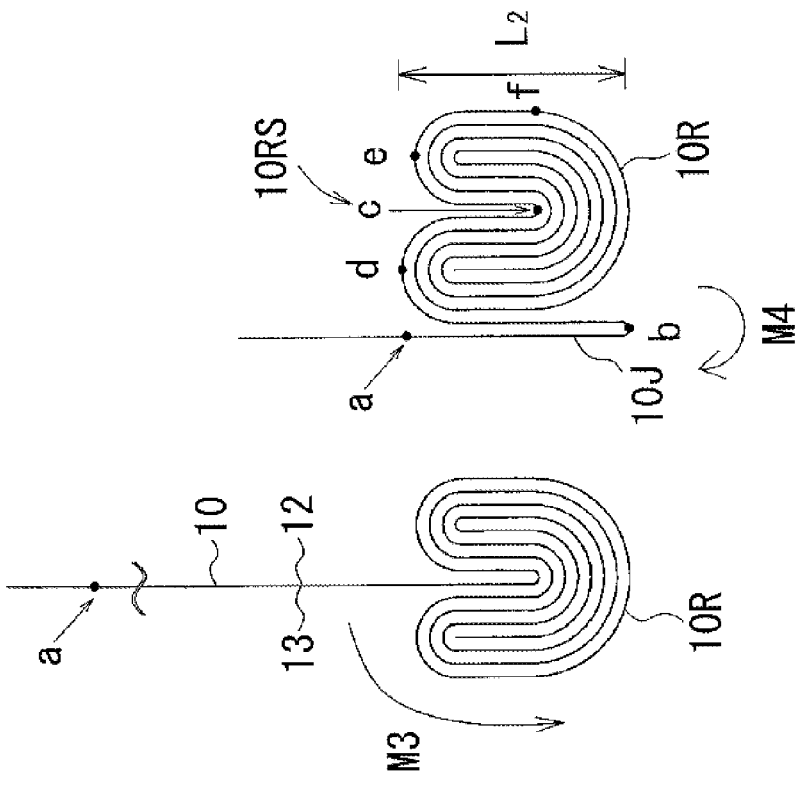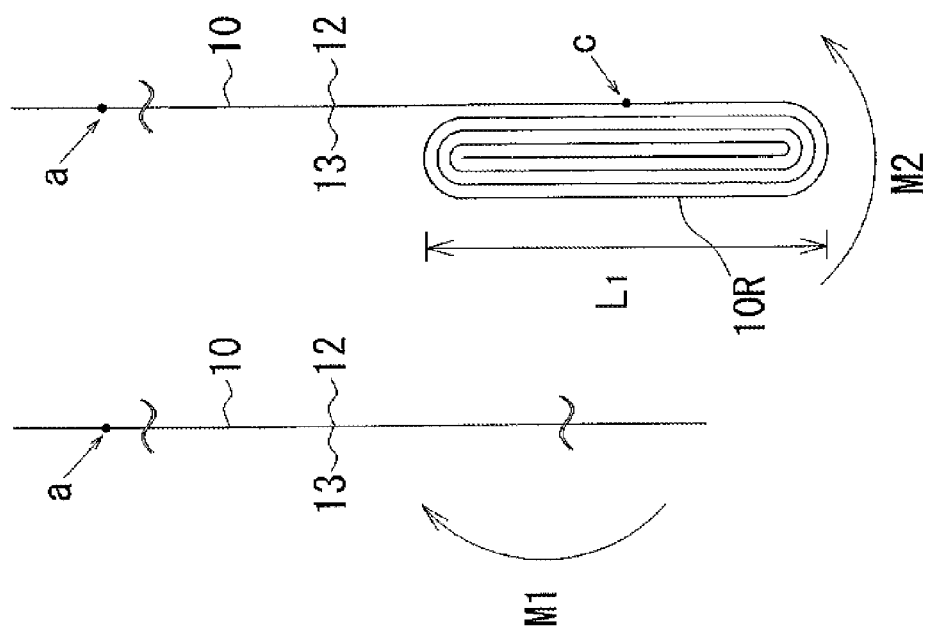

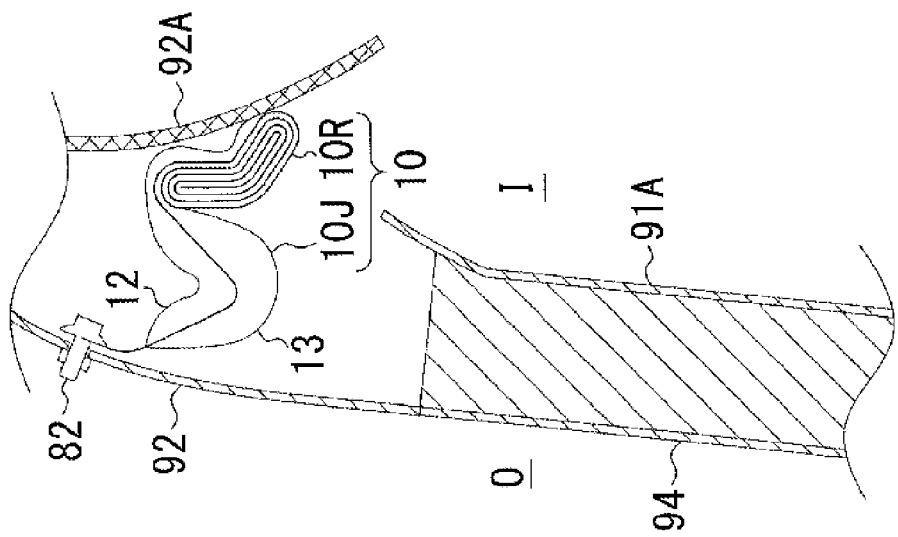
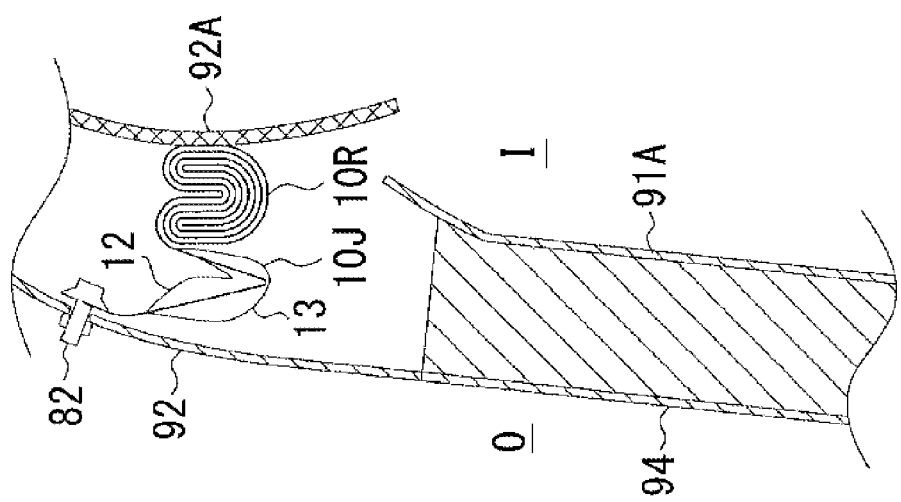
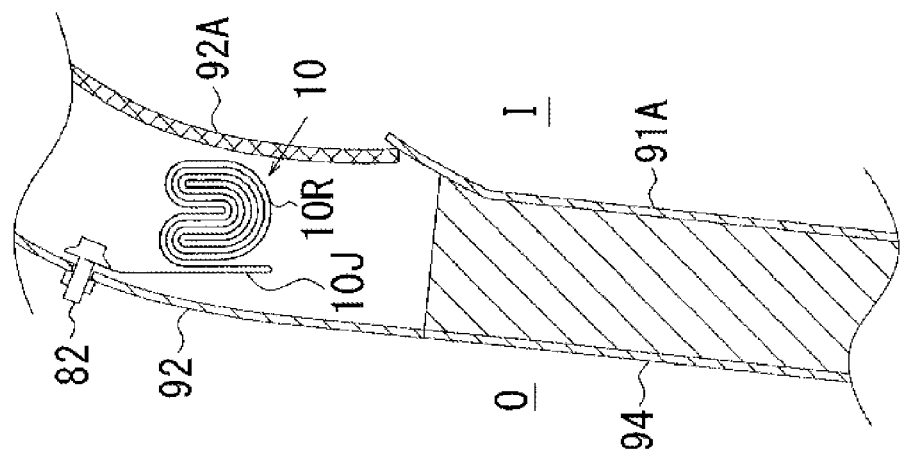

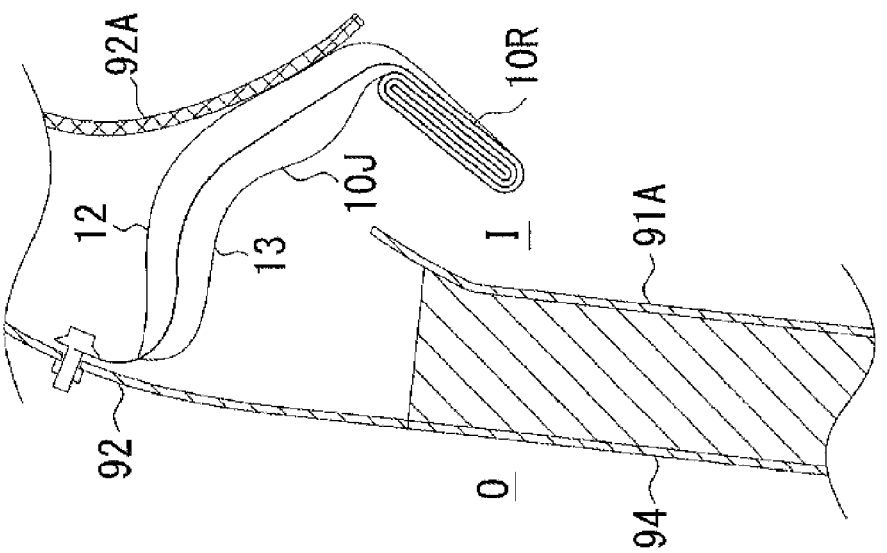
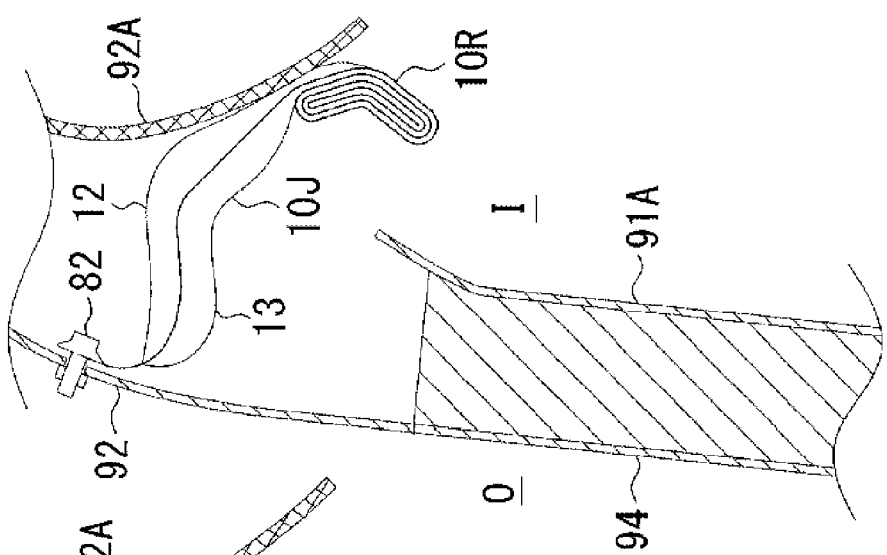
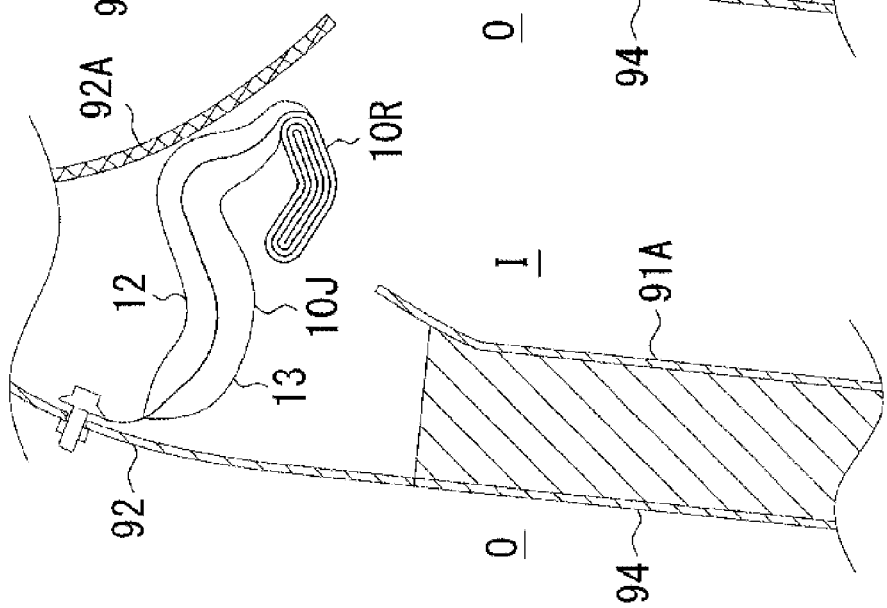

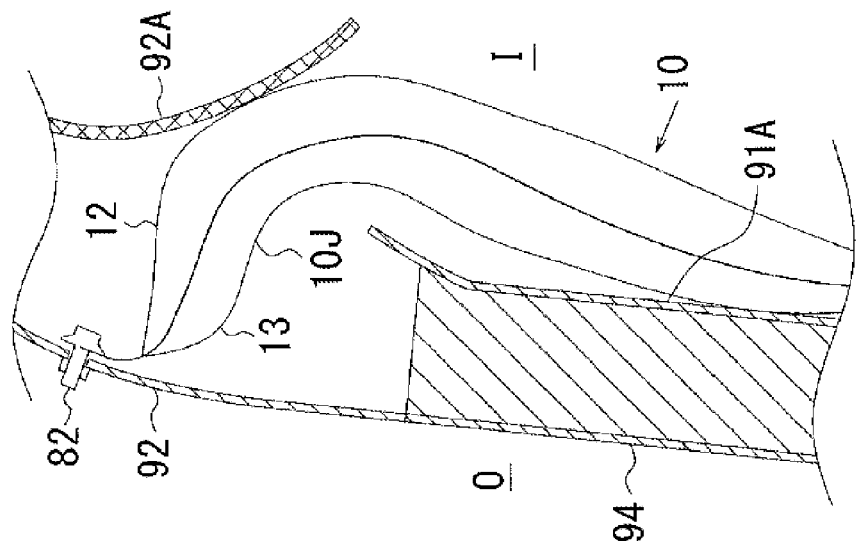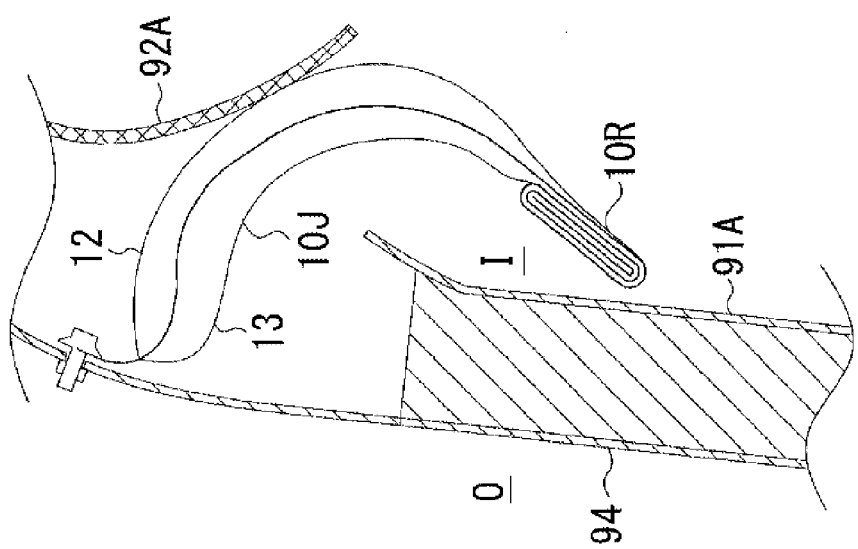

PRIOR ART

AIRBAG DEVICE

CROSS REFERENCE TO RELATED APPLICATIONS

This is a National Stage of International Application No. PCT/JP2012/065502 filed Jun. 18, 2012, claiming priority based on Japanese Patent Application No. 2011-139791 filed Jun. 23, 2011, the contents of all of which are incorporated herein by reference in their entirety.

TECHNICAL FIELD

The present invention relates to an airbag device that is installed in a vehicle, such as a car, to protect an occupant, and, for example, it relates to an airbag device that deploys, in a vehicle cabin, an airbag like a curtain in the front-rear direction of the vehicle.

BACKGROUND ART

A known airbag device in the related art is configured to store a folded airbag in the upper part of a side wall inside a vehicle cabin, a vehicle-interior side portion thereof being covered with an airbag cover, and is configured to quickly inflate and deploy an airbag along the side wall inside the vehicle cabin, while reducing the amount by which the airbag projects toward the vehicle-interior side when inflated and deployed by folding the upper part and lower part of the airbag in different ways (see PTL 1).

FIG. 5 is a schematic cross-sectional view of this known head-protection airbag device in a folded state.

The above-described conventional airbag device includes an airbag 111 in a folded state, the airbag 111 being attached to the upper part of the side wall inside the vehicle cabin so as to extend in the vehicle front-rear direction; an airbag cover 108 that covers a vehicle-cabin-interior side portion of the airbag 111; and an inflator (not shown) that supplies gas to the airbag 111 to inflate and deploy the airbag downward inside the vehicle cabin.

The airbag 111 is stored in a space surrounded by the upper part of a pillar garnish 107, an inner panel 102 on the vehicle body side, and the airbag cover 108 in such a manner that it is wrapped in a wrapping member and is maintained in a folded shape. The airbag 111 includes an attachment portion 125 that has an attachment bracket 130 on the upper edge side thereof and is securely fixed to the inner panel 102 with an attachment bolt 131 inserted through this attachment bracket 130.

The airbag 111, in a stored state as shown in the figure, includes a roll-folded portion 138 formed by rolling the airbag 111 from the lower edge and a supply path portion 115 continuous with the roll-folded portion 138.

The supply path portion 115 is a portion into which inflation gas flows at the beginning of inflation of the airbag 111, the upper edge of the supply path portion 115 being disposed in the front-rear direction of the vehicle. As shown in the figure, the supply path portion 115 is provided with an inverted U-shaped portion 141 that is bent into an inverted U shape so as to cover the upper part of the roll-folded portion 138.

The inverted U-shaped portion 141 of the supply path portion 115 is formed such that a portion 115b located on the upper side when inflation and deployment are completed is located on a vehicle-exterior side O and a portion 115c located on the lower side when inflation and deployment are completed is located on a vehicle-interior side I.

The airbag cover 108 is disposed so as to cover a portion on the vehicle-interior side I of the folded and stored airbag 111 and, as shown by a dashed line in the figure, is pushed by the supply path portion 115, which is deployed at the beginning of inflation of the airbag 111, and is opened into the vehicle-interior side I to allow the airbag 111 to pass therethrough toward the vehicle-interior side I.

Because the conventional airbag 111 is configured as described above, when the inflation gas from the inflator is supplied to the supply path portion 115 at the time of inflation and deployment, the inverted U-shaped portion 141, which is disposed so as to wrap the upper part of the roll-folded portion 138, is inflated and deployed first. When the inverted U-shaped portion 141 is inflated and deployed, the roll-folded portion 138 is pushed downward in the figure due to the pressure and strikes an inclined upper end 107a of the pillar garnish 107. Subsequently, the roll-folded portion 138 enters the vehicle cabin through the cover 108, which has been pushed and opened by the inflating and deploying inverted U-shaped portion 141, and is deployed along the pillar garnish 107 while unfolding the roll fold rolled so as to be deployed toward the vehicle-exterior side O.

However, as has been described above, because this airbag device is configured such that the supply path portion 115, which is inflated at the initial stage of deployment, strongly pushes the roll-folded portion 138 downward at the beginning of inflation and deployment, causing it to strike the inclined upper end 107a of the pillar garnish 107, that is, such that the roll-folded portion 138 is caused to strike the inclined upper end 107a of the pillar garnish 107 before entering the vehicle-interior side I, there is a problem in that the speed at which it enters the vehicle cabin decreases correspondingly.

CITATION LIST

Patent Literature

PTL 1: Japanese Unexamined Patent Application, Publication No. 2004-58848

SUMMARY OF INVENTION

Technical Problem

The present invention has been made in view of the above-described problem of the conventional airbag device, and an object thereof is to enable an airbag to be quickly deployed without reducing the deployment speed of the airbag by omitting an action of strongly pushing the airbag downward, causing the airbag to once strongly strike a pillar trim (or pillar garnish) at the initial stage of deployment, as in the conventional configuration.

Solution to Problem

The present invention is an airbag device including an airbag attached to an upper part of a side wall inside a vehicle cabin in the front-rear direction of a vehicle, and an inflator that inflates and deploys the folded airbag toward the lower side of the vehicle cabin. The airbag includes a roll-folded portion rolled from one end thereof opposite from an upper edge attached to the upper part, and an accordion-folded portion continuous with the roll-folded portion and folded in an accordion manner. The accordion-folded portion is folded so as to be located at a side of the roll-folded portion. The accordion-folded portion is formed by a folding line to have the same width as the width of the roll-folded portion folded into two, and is located at a side facing to the vehicle-exterior of the two-folded portion of the roll-folded portion.

Advantageous Effects of Invention

According to the present invention, when the airbag is deployed, it is possible to cause the accordion-folded portion to directly push the roll-folded portion in a compact state, in which it is folded into two, from the storage portion toward the vehicle-cabin-interior side, in the vehicle width direction. That is, the airbag is not strongly pushed downward at the initial stage of deployment. Thus, because the airbag is not strongly urged against the lower portion of the airbag storage portion (e.g., an upper end portion of the pillar trim) at the initial stage of deployment, as in the conventional configuration, the deployment speed does not decrease, and quick deployment is possible. Furthermore, in the attachment of the pillar trim, it is possible to ease the strength requirement and shape requirement set based on an assumption that it comes into contact with the airbag and diverts the deployment direction of the airbag.

BRIEF DESCRIPTION OF DRAWINGS

FIG. 1A is a front view of an airbag device according to an embodiment of the present invention, showing a side wall of a vehicle and the airbag device through an inner surface of the vehicle, while omitting the rear side of the vehicle. FIG. 1B is a front view showing the entirety of an airbag of the airbag device in FIG. 1. In both figures, the airbag is shown in a deployed state.

FIG. 2 includes diagrams schematically showing a process of folding the airbag of the airbag device according to this embodiment.

FIGS. 4A, 4B, and 4C are diagrams schematically showing the airbag, in which an accordion-folded portion and a roll-folded portion are side-by-side, attached to the vehicle.

FIGS. 4D, 4E, and 4F are diagrams schematically showing the airbag, in which the accordion-folded portion and the roll-folded portion are side-by-side, attached to the vehicle.

FIGS. 4G and 4H are diagrams schematically showing the airbag, in which the accordion-folded portion and the roll-folded portion are side-by-side, attached to the vehicle.

DESCRIPTION OF EMBODIMENTS

Figure 3A:
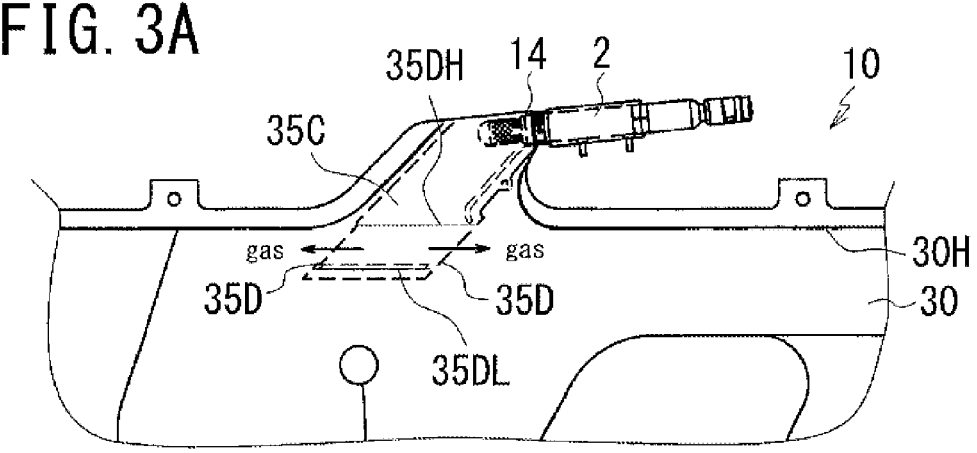
FIG. 3A is a partially enlarged view of FIG. 1B, showing a portion in the vicinity of a gas introduction portion according to the embodiment of the present invention.

An embodiment of an airbag device according to the present invention will be described with reference to the drawings.

An airbag device according to this embodiment is of a type that inflates and deploys an airbag downward from the upper part (upper edge) of a side wall inside a vehicle cabin, along the side wall inside the vehicle cabin, and includes an inflatable airbag folded in a predetermined state, and an inflator that generates gas and supplies the gas to the airbag in an emergency of the vehicle or when an impact is detected.

The following description will be given by taking, as an example, a side airbag device that inflates and deploys an airbag like a curtain from the upper part of the side wall inside the vehicle cabin and deploys the airbag over a predetermined area, on the vehicle-interior side, of the side wall inside the vehicle cabin, from a driver's seat and a passenger's seat to rear seats on the rear side of the vehicle to protect, mainly, the head of occupants in the front and rear seats.

FIG. 1A is a front view of an airbag device 1 according to an embodiment of the present invention, showing the side wall of the vehicle and the airbag device 1 through an inner surface of the vehicle, while omitting the rear side of the vehicle. FIG. 1B is a front view showing the entirety of an airbag 10 of the airbag device 1 in FIG. 1. In both figures, the airbag 10 is shown in a deployed state.

The airbag device 1 includes the airbag 10 and the inflator 2. As will be described below, the airbag (herein, a curtain airbag) 10 is folded in an elongated shape in a stored state.

The airbag device 1 is installed in a vehicle 90 and, when receiving an activation signal, activates the inflator 2 to generate gas. This gas is supplied to an inflatable section 30 of the airbag 10, thereby unfolding the airbag 10, as will be described below, to an inflated and deployed state like a curtain, as shown in FIG. 1A.

As shown in the figure, the vehicle 90 includes, on a side wall 91 inside the vehicle cabin, a roof rail 92 located on the upper side, a front pillar (A pillar) 93 located on the front side, a center pillar (B pillar) 94 located in the middle in the front-rear direction, and a rear pillar (C pillar) (not shown) located on the rear side. The side wall 91 has a front door 95 on the front side and a rear door 96 on the rear side.

A pillar trim 91A (see FIG. 4) and a headlining 92A are attached to the side wall 91, the pillar trim 91A constituting a surface member inside the vehicle 90 (interior member). The headlining 92A covers a roof (not shown) and the roof rail 92.

The airbag 10 is disposed from the rear pillar to the front pillar 93, along the upper part (upper edge) of the side wall 91 inside the vehicle cabin. As shown in FIG. 1B, the airbag 10 is a rectangular bag in a developed state and is formed of, for example, base fabric pieces made of resin-coated fabric. The airbag 10 includes a front base fabric piece (front panel) 12 on the occupant side and a back base fabric piece (back panel) 13 on the side wall 91 side. Furthermore, the airbag 10 has a gas supply port 14, a belt-like connecting member 20, and a plurality of (in FIG. 1B, six) fixing fabric pieces 21 to 26.

One end of the connecting member 20 is attached to the front end of the airbag 10, and the other end thereof is attached to the front pillar 93. A plurality of fixing fabric pieces 21 to 26 have a rectangular shape and are formed integrally at the upper edge of the airbag 10. Furthermore, the fixing fabric pieces 21 to 26 are arranged over the entire upper edge of the airbag 10. The connecting member 20 and the fixing fabric pieces 21 to 26 are fixed to predetermined positions of the front pillar 93 and the roof rail 92 with fixing means (not shown), such as bolts, whereby the airbag 10 is attached to the upper part of the vehicle body.

Like the typical airbag, the front base fabric piece 12 and the back base fabric piece 13 are formed in the same shape, are superposed on each other, and are joined along the outer-peripheral joining portion 15. The airbag 10 is delimited by the outer-peripheral joining portion 15, and an inflatable section 30 is formed between the base fabric pieces 12 and 13. More specifically, the outer-peripheral joining portion 15 determines the outer-peripheral shape of the inflatable section 30, and the base fabric pieces 12 and 13 are joined together at the outer-peripheral joining portion 15 in an air-tight manner, by being sewn together along the outer-peripheral joining portion 15 or by being sealed, at the seam, with an adhesive.

A front inflatable section 31, a rear inflatable section 32, and a connecting inflatable section 33, which are delimited by the outer-peripheral joining portion 15, are formed in the airbag 10. The front inflatable section 31 is formed to have the largest length in the front-rear direction in the inflatable section 30 and is inflated at a side of the window portion in the front door 95 and the center pillar 94 to receive, mainly, the occupant in the front seat.

The rear inflatable section 32 is formed to have a smaller length than the front inflatable section 31 in the front-rear direction, is disposed on the rear side of the airbag 10, and is inflated above the rear door to receive, mainly, the occupant in the rear seat. The connecting inflatable section 33 is provided between the front inflatable section 31 and the rear inflatable section 32 to connect the inflatable sections 31 and 32 at the upper edge of the airbag 10.

A non-inflatable section 34 that extends upward from the lower edge of the airbag 10 is formed among the three inflatable sections 30 (31, 32, 33). The non-inflatable section 34 of the airbag 10 is provided outside the inflatable section 30 and, hence, is maintained in an uninflated state even when the airbag 10 is inflated.

The gas supply port 14 is an opening (insertion port) through which the inflator 2 is inserted into the airbag 10, and it is formed at a substantially intermediate position of the airbag 10 in the front-rear direction. The base fabric pieces 12 and 13 project obliquely upward from the upper edge of the airbag 10, at the gas supply port 14, and the side edges thereof are joined together so as to be continuous with the outer-peripheral joining portion 15. Thus, the gas supply port 14 is formed integrally at the upper edge of the airbag 10.

The airbag 10 has first to fourth inner joining portions 16 to 19 in the inflatable section 30 delimited by the outer-peripheral joining portion 15. The base fabric pieces 12 and 13 are joined together by sewing and bonding at the plurality of inner joining portions 16 to 19. The inner joining portions 16, 17, and 19 extend inward of the inflatable section 30 from the outer-peripheral joining portion 15 and each end thereof is joined in a circular shape (circular portions 16A, 17A, and 19A) at an end in the inflatable section 30. Furthermore, both ends of the inner joining portion 18 are joined in a circular shape (circular portions 18A) in the inflatable section 30.

The circular portions 16A to 19A of the inner joining portions 16 to 19 are arranged at a predetermined distance from the outer-peripheral joining portion 15 at the lower edge of the airbag 10. The inner joining portions 16 to 19 serve as partitions for dividing the inflatable section 30 and reduce the amount by which the inflatable section 30 is inflated in the vehicle width direction to make the airbag 10 be inflated in a predetermined shape.

In this embodiment, the inflatable section 30 is divided into first to fifth air chambers 35 to 39 by the inner joining portions 16 to 19.

The inflator 2 is a cylinder-type gas generator having a cylindrical shape and has a gas discharge portion at an end in the length direction.

The inflator 2 and the airbag 10 are connected via a gas introduction portion (diffuser) 35C that is sewn in a tubular shape and is formed on the airbag 10, and are mounted to the roof rail 92 within the headlining 92A via an attachment bracket (not shown), which is connecting means, at a position above the center pillar 94.

The gas supply port 14 is fixed to the inflator 2 in an air-tight manner with a clamp or a band (not shown) that is fastened from the outside. The gas generated by the inflator 2 (inflation gas) flows from the gas supply port 14 into the first to fifth air chambers 35 to 39. Of these air chambers, the first air chamber 35 is completely inflated at a predetermined time after the other air chambers 36 and 37 have been completely inflated. Furthermore, the fourth and the fifth air chambers 38 and 39 are inflated according to the order in which the gas flows therein.

FIGS. 2A to 2D are diagrams schematically showing the process of folding the above-described airbag 10.

FIG. 2A shows the airbag 10 formed of the front base fabric piece 12 and the back base fabric piece 13, before being folded.

In the figure, the side to the left of the airbag 10 is the vehicle-exterior side, and the side to the right of the airbag 10 is the vehicle-interior side. As shown in FIG. 2A, first, the uninflated airbag 10 is spread out such that the base fabric pieces 12 and 13 are laid flat on each other. Next, the lower edge of the airbag 10 is folded several times in direction M1, with a constant width L1, toward the upper edge so as to be rolled on the vehicle-exterior side, thus making a predetermined number of roll-folds, rolled toward the vehicle-exterior side, until a state shown in FIG. 2B is reached. Note that reference sign a in FIG. 2 indicates a starting point of an accordion-folded portion 10J of the airbag 10.

Next, a roll-folded portion (roll-folded portion) 10R of the airbag 10 in FIG. 2B is folded counterclockwise (in direction M2) at a midpoint, c, of the other surface thereof in the roll width (L1) direction and, then, is folded into two in a U shape (valley fold) at the midpoint c (FIG. 2C). Thereafter, an airbag portion linearly extending from the intermediate position of the two-folded roll-folded portion 10R is bent in direction M3 toward the lower edge of the airbag 10, along the roll-folded portion 10R on the vehicle-exterior side, and is folded back in direction M4 toward the upper edge of the airbag 10, at a portion (folding line b) having the same width (vertical width) as the roll width L2 of the two-folded roll-folded portion 10R (i.e., accordion fold) (FIG. 2D). FIG. 2D shows the thus-obtained folded airbag 10 including the accordion-folded portion 10J on the left side and the roll-folded portion 10R on the right side, which are side-by-side.

Herein, reference sign d in FIG. 2D indicates a terminal point of the accordion-folded portion 10J as well as a starting point of the roll-folded portion 10R. The region between d and e (the region between top portions of the two-folded roll-folded portion) is an initially inflated part of the roll-folded portion 10RS of the roll-folded portion 10R continuous with the accordion-folded portion 10J.

Furthermore, reference sign f in the figure indicates a portion located at a substantially intermediate position, on the interior side, of the roll width L2 of the two-folded roll-folded portion 10R, the portion being the most vehicle-cabin-interior side of the roll-folded portion 10R.

After folded in the manner described above, similarly to the conventional configuration, a tearable wrapping member (not shown) for preventing deformation of the folded shape is wound in a suitable way on a predetermined portion of the airbag 10 in the longitudinal direction, thus completing folding.

Next, referring to FIG. 3, the relationship between the portions a to f, which are shown in FIG. 2 in association with the accordion-folded portion 10J and the roll-folded portion 10R of the airbag, and the airbag 10 in a deployed state will be described.

FIG. 3A is a partial enlarged view of FIG. 1B, showing a portion in the vicinity of the gas introduction portion (diffuser) 35C of the airbag 10, according to the embodiment of the present invention.

First, in the figure, the gas supply port 14 of the airbag 10 through which the gas from the inflator is supplied is provided at the upper edge of the airbag 10, at a portion at the opposite end of the accordion-folded portion from the roll-folded portion, so that the airbag is inflated and deployed initially from the according portion with the gas from the inflator, when the inflator is activated. Furthermore, an upper edge 30H of the inflatable section 30 of the airbag 10 is located closer to the upper edge of the airbag 10 than the folding line (bent portion) b in FIG. 2, more desirably, at a position substantially equal to the position of the starting point, a, of the accordion-folded portion 10J. In other words, it is desirable that the starting point a of the accordion-folded portion 10J be located at the upper edge 30H of the inflatable section 30 of the airbag 10.

Furthermore, as in this example, when the gas introduction portion 35C is used to introduce the gas from the inflator 2 into the inflatable section 30 of the airbag 10, it is configured such that an upper end 35DH of gas discharge ports 35D of the gas introduction portion 35C is located closer to the upper edge of the airbag 10 than the bent portion b in FIG. 2, more desirably, substantially at the position of the starting point, a, of the accordion-folded portion 10J, and such that a lower end 35DL of the gas discharge ports 35D is located at the position of the initially inflated part of the roll-folded portion 10RS (the position between d and e in FIG. 2), more desirably, at a position between c and e of the initially inflated part of the roll-folded portion 10RS in FIG. 2.

By determining the positions of the starting point and terminal point of the accordion fold and roll fold and the above-described portions in association with the upper edge 30H of the airbag, or the upper end 35DH of the gas discharge ports 35D, and the lower end 35DL of the gas discharge ports 35D in this manner, when the airbag 10 starts to be inflated, the inflation reliably starts from the accordion-folded portion 10J. Furthermore, with the gas blown from the gas discharge ports 35D, an area from the accordion-folded portion 10J to the initially inflated part of the roll-folded portion 10RS, especially in the vicinity of the gas discharge ports 35D, can be more quickly inflated.

Furthermore, by disposing the lower end 35DL of the gas discharge ports 35D of the gas introduction portion 35C at the position of f in FIG. 2, beyond the position of e in FIG. 2, by, for example, extending the length of the gas introduction portion 35C, an area from the accordion-folded portion 10J to a portion on the lower edge side beyond the initially inflated part of the roll-folded portion 10RS of the roll-folded portion 10R (the portion from e to f in FIG. 2D), especially in the vicinity of the gas discharge ports 35D, can be more quickly inflated.

Thus, it is possible to cause the airbag to be more quickly deployed toward the vehicle-interior side, beyond the pillar trim 91A (FIG. 4), and downward along the pillar trim 91A (side wall 91) while unfolding the roll fold.

Figure 3B:
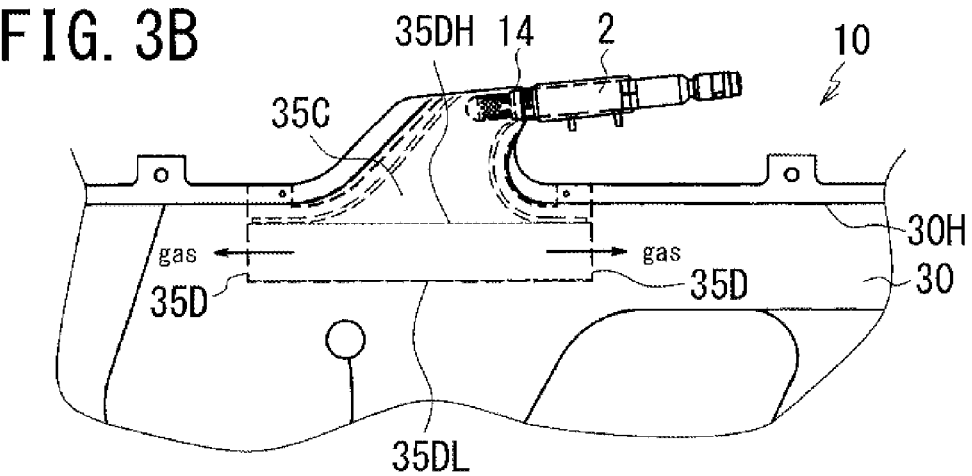
FIGS. 3B and 3C are diagrams similar to FIG. 3A, each showing a gas introduction portion according to another embodiment.
Figure 3C:
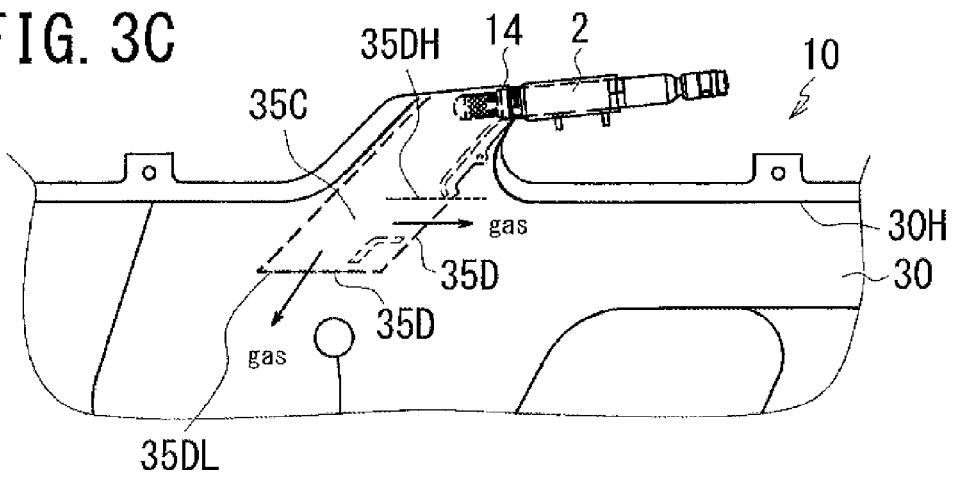
Figure 5:
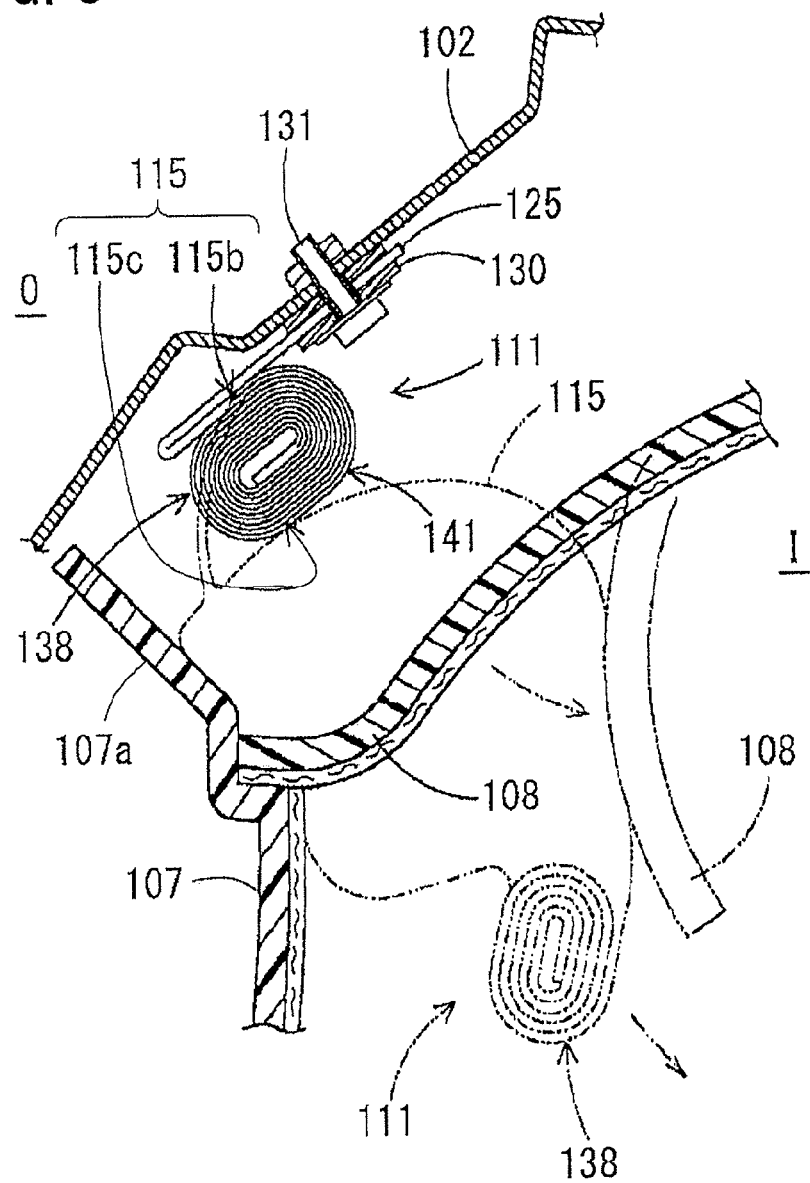
FIG. 5 is a schematic diagram for explaining a process of folding a conventional airbag.

FIGS. 3B and 3C show embodiments in which the shape of the gas introduction portion 35C is different from that in FIG. 3A.

More specifically, the gas introduction portion 35C in FIG. 3B has a substantially inverted T shape in front view, in which the gas discharge ports 35D are provided at the left and right side surfaces thereof, similarly to FIG. 3A. Thus, the gas hitting the lower end portion of the gas introduction portion 35C is split substantially horizontally toward the side surfaces thereof, i.e., to the left and right in the figure.

The gas introduction portion 35C in FIG. 3C has a substantially I shape in front view, similarly to that shown in FIG. 3A, but it has the gas discharge ports 35D in the bottom and one side surface thereof (in the example shown, in the right side surface). Thus, the gas introduced therein is split toward the lower end and toward the right side surface.

In each gas introduction portion 35C, the upper end 35DH and the lower end 35DL of the gas discharge ports 35D are as illustrated, and the relationship with respect to the portions a to f in FIG. 2D is the same as the description on FIG. 3A.

Next, deployment of the above-described airbag 10 will be described.

FIGS. 4A to 4H show, in sequence, the airbag 10 according to this embodiment being deployed.

FIG. 4A is a diagram schematically showing the airbag 10 attached to the vehicle, the airbag being folded in a state shown in FIG. 2D, i.e., in a shape which the accordion-folded portion 10J and the roll-folded portion 10R are side-by-side in the vehicle width direction. FIG. 4A shows, in outline, cross sections taken at the B pillar of the vehicle.

The airbag 10, in a folded state, is fixed to the roof rail 92 (FIG. 1A) with fixing means 82 including, for example, bolts and nuts at the upper end thereof (fixing fabric pieces). Furthermore, the airbag 10 is stored in a storage portion surrounded by an upper end portion of the pillar trim 91A and the headlining 92A, which is made of, for example, plastic and is attached to the roof rail 92 in such a manner that a portion covering the vehicle-interior side (i.e., the airbag cover) can be opened toward the vehicle-interior side I (vehicle-cabin-interior side).

When a vehicle collision occurs, the airbag device 1 installed in the vehicle activates the inflator 2 (FIG. 1), causing it to generate inflation gas, and supplies the inflation gas to the airbag 10 (first to fifth air chambers 35 to 39). By doing so, while the folded portions are unfolded in sequence from the accordion-folded portion 10J to the roll-folded portion 10R, i.e., sequentially, the inflation gas is introduced into the first to fifth air chambers 35 to 39, inflating the air chambers 35 to 39, whereby the airbag 10 is inflated and deployed like a curtain toward the inside of the vehicle cabin, located on the lower side of the vehicle, from the upper part of the vehicle side wall where the fixing fabric pieces 21 to 26 are provided.

More specifically, when the inflator 2 is activated, and the inflation gas is generated due to a vehicle collision or the like, the generated inflation gas is introduced into the accordion-folded portion 10J of the airbag 10 via the gas supply port 14 of the airbag 10. As a result, the airbag 10 starts to be inflated with the inflation gas from the inflator 2. When the wrapping member wound around the folded airbag 10 is detached, the accordion-folded portion 10J is first deployed while being inflated, pushing out the roll-folded portion 10R located to the vehicle-interior side I thereof toward the headlining 92A. The roll-folded portion 10R pushed out toward the headlining 92A strikes the headlining 92A. When the roll-folded portion 10R strikes the headlining 92A, the airbag 10 (roll-folded portion 10R) receives a reaction force from the headlining 92A and is prevented from being deployed from a two-fold state. As a result, the airbag 10 pushes and opens the headlining 92A, serving as the airbag cover, and bursts out in the cabin (FIG. 3B), while maintaining a compact shape. At the same time, because the initially inflated part of the roll-folded portion 10RS (the portion from d to e in FIG. 2D) starts to be inflated, the roll-folded portion 10R of the freed airbag 10, folded into two in a U shape, is pushed and opened at the initially inflated part of the roll-folded portion 10RS and is returned to a substantially original roll-fold width L1 (see FIG. 2) (FIGS. 4C and 4D). Note that, at this time, a force that strongly pushes the roll-folded portion downward is not generated, as in the case of the conventional airbag having an inverted U-shaped folded portion.

The roll-folded portion 10R having returned to substantially the original roll-fold width L1 is pushed by the initially inflated part of the roll-folded portion 10RS, which is being inflated, and the lower end portion thereof (the portion between e and f in FIG. 2D), which starts to be inflated, and passes the pillar trim 91A (FIGS. 4D, 4E, 4F), while being rotated in the direction of the vehicle-exterior side O, i.e., herein, counterclockwise, and returning to the original roll-fold width L1. When the roll-folded portion 10R has passed the pillar trim 91A, the roll-folded portion 10R, while being inflated sequentially from a portion following the initially inflated part of the roll-folded portion 10RS, is pushed by the inflating portion, is rotated in the direction opposite to the winding direction (in the direction of the vehicle-exterior side O), and is deployed downward while moving in the direction of the vehicle-exterior side O (FIG. 4G). That is, the roll-folded portion 10R, after passing the upper end portion of the pillar trim 91A, is deployed along the pillar trim 91A (side wall 91), and after that, the roll-folded portion 10R is repeatedly rotated in the direction of the vehicle-exterior side O while being inflated along the pillar trim 91A (side wall 91) and is deployed downward while unfolding the roll fold (FIG. 4H).

Note that the length of the accordion-folded portion 10J of the airbag 10 is set such that the roll-folded portion 10R bursts out from the pillar trim 91A toward the vehicle-interior side I while the accordion-folded portion 10J is being inflated and deployed.

As has been described above, when the airbag 10 is inflated and deployed, only the accordion-folded portion 10J is deployed in the storage portion (above the pillar trim 91A), and the roll-folded portion 10R is pushed out to the side while being maintained in a compact, substantially two-fold state in the top-bottom direction.

The airbag 10 having burst out into the vehicle cabin is deployed toward the vehicle-exterior side O and downward, between the side of the occupant and the window, that is, between the occupant's head and the vehicle window. Thus, it can reliably protect the occupant with the inflated first to fifth air chambers 35 to 39.

According to this embodiment, at the initial stage of deployment, the airbag 10 deploys first to the side, toward the vehicle-interior side I. At this time, the two-folded roll-folded portion 10R of the airbag 10 pushes and opens the headlining 92A, serving as the airbag cover, while maintaining a compact, substantially two-folded state, and passes the upper end of the pillar trim 91A, while unfolding the two fold. Thus, the roll-folded portion 10R is not strongly pushed toward the pillar trim 91A in the process in which the accordion-folded portion 10J is deployed, as in the conventional configuration.

Therefore, in the process of deploying the airbag 10, at the initial stage of deployment, there is no possibility that the airbag 10 (roll-folded portion 10R) is strongly pressed against the pillar trim 91A, decreasing the deployment speed thereof. In addition, once the two-fold is opened, the roll-folded portion 10R is smoothly deployed, starting from the initially inflated part of the roll-folded portion 10RS. Thus, the deployment speed can be increased.

Furthermore, because the airbag 10 is deployed toward the vehicle-exterior side O, while unfolding the roll fold, after the accordion fold is unfolded, it can be easily inflated and deployed between the occupant and the window pane and reliably protect the occupant.

Moreover, because the roll fold is folded into two at the time of assembly, the number of roll folds can be reduced compared with the case where the roll fold is not folded into two. Thus, it is possible to obtain advantages, such as an increase in production efficiency and a reduction in cross-sectional area of the folded airbag.

Although the embodiments of the present invention have been described above, the present invention is not limited to these embodiments, and it may be variously changed and modified within a scope of the present invention as defined in Claims.

REFERENCE SIGNS LIST

1: airbag device;
2: inflator;
10: airbag;
10J: accordion-folded portion;
10R: roll-folded portion;
10RS: initially inflated part of the roll fold;
12: front base fabric piece;
13: back base fabric piece;
14: gas supply port;
15: outer-peripheral joining portion;
16 to 19: inner joining portion;
20: connecting member;
21 to 26: fixing fabric piece;
30: inflatable section;
30H: upper edge of inflatable section 30;
31: front inflatable section;
32: rear inflatable section;
34: non-inflatable section;
35C: gas introduction portion;
35D: gas discharge port;
35DH: upper end portion of gas discharge port;
35DL: lower end portion of gas discharge port;
35 to 39: first to fifth air chambers;
82: fixing means;
90: vehicle;
91: side wall;
91A: pillar trim;
92: roof rail;
92A: headlining;
93: front pillar; and
94: center pillar.

The invention claimed is:

1. An airbag device comprising:
an airbag attached to an upper part of a side wall inside a vehicle cabin in a front-rear direction of a vehicle, a vehicle-cabin-interior side portion of the airbag being covered by an airbag cover; and
an inflator that provide a gas and inflates and deploys the airbag in a folded state toward a lower side of the vehicle cabin,
the airbag including a roll-folded portion that in said folded state is rolled from one end thereof opposite from an upper edge attached to the upper part so as to be able to deploy toward a vehicle-exterior side, and an accordion-folded portion continuous with the roll-folded portion that in said folded state is folded in an accordion manner, the accordion-folded portion being folded so as to be located at the side of the roll-folded portion, wherein
the accordion-folded portion is formed by a folding line to have a width in a top-bottom direction that is the same as a width of the roll-folded portion folded into two in a U shape in its entirety toward the upper part of the side wall inside the vehicle cabin, and is located at a side facing to the vehicle-exterior of a two-folded portion of the roll-folded portion,
wherein an initially inflated part of the roll-folded portion continuous with the accordion-folded portion is folded so as to be stored between a two-folded portion of the roll-folded portion, and
wherein the inflating and deploying accordion-folded portion can push an airbag toward a vehicle-cabin-interior side and open the airbag cover and the airbag can enter the vehicle cabin from an airbag storage position, keeping in a state in which the roll-folded portion is folded into two.

2. The airbag device according to claim 1, wherein an upper edge of an inflatable section of the airbag is folded so as to be located closer to the upper edge of the inflatable section of the airbag than the folding line.

3. The airbag device according to claim 1, wherein a gas supply port of the airbag through which the gas from the inflator is supplied is formed at an end portion of the accordion-folded portion opposite from the roll-folded portion such that, when the inflator is activated, the airbag is inflated and deployed initially from the according-folded portion with the gas from the inflator.

* * * * *